A. SCHWARZ.
Preparation of Mash.
No. 197,413. Patented Nov. 20, 1877.
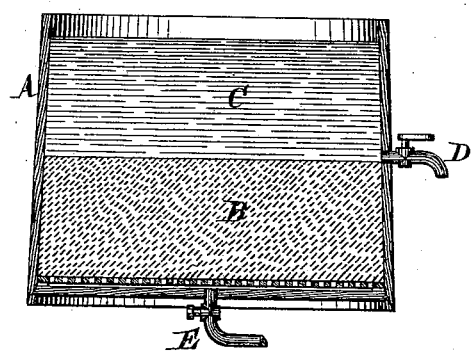

UNITED STATES PATENT OFFICE.

ANTON SCHWARZ, OF NEW YORK, N. Y.

IMPROVEMENT IN PREPARATION OF MASH.

Specification forming part of Letters Patent No. 197,413, dated November 20, 1877; application filed July 19, 1877.

*To all whom it may concern:*

Be it known that I, ANTON SCHWARZ, of the city, county, and State of New York, have invented a new and Improved Process for Brewing Beer, which invention is fully set forth in the following specification, reference being had to the accompanying drawing, which represents a diagram of the mash-tun which I use in carrying out my process.

My invention consists in drawing off, above the malt which settles down on the bottom of the mash-tun after the agitation ceases, the wort which collects on the top of said malt during the time of rest, then heating the same to the boiling-point and returning it into the mash-tun after the formation of sugar in the malt has been completed, and finally drawing off the liquid without any further mashing or agitation, so that without disturbing the effect of the diastase in producing sugar, the temperature of the liquid can be raised to such a temperature that the mucine and gluten matter contained in the malt are dissolved and carried off by the wort.

The object of mashing in the process of brewing is to extract from the malt all the substances contained therein which are requisite for the production of a pure wort, and by the effect of the diastase at a certain temperature to transform the starch into sugar. Different methods are employed for this purpose, such as thick mashing, thin mashing, and water mashing. In thick mashing (decoction) the effect of the diastase on the starch is destroyed, and in water mashing (infusion) the formation of fermentable sugar is increased, and that of dextrine decreased.

For the purpose of producing the extract of malt and forming the wort, the same water is used which has been employed in treating and mashing the dry malt until the sugar-forming temperatures are reached, which are situated between 140° and 165° Fahrenheit. This temperature is reached either by boiling certain parts of the mash, or by the addition of hot water, or by heating the entire mash by means of steam, and it is designated terminal mashing temperature (158° to 165°.) If the temperature is raised above 165° the effect of the diastase on the starch is destroyed.

It is a well-known fact that the quantity of malt extract obtained is largest if a certain definite quantity of water is employed in mashing. The quantity is thirty-two gallons for two bushels of malt. When the terminal mashing temperature is reached the entire mass is left in a state of rest, in order to produce a perfect formation of sugar, and during this state of rest the heavy malt settles down on the bottom of the mash-tun, and that portion of the wort which is not absorbed by the malt collects on the top thereof. The formation of sugar, however, does not go on in the wort collected above the malt, which remains intact, even after a long state of rest, and the extract is taken from the malt only by causing this wort to percolate through the malt. Such malt, however, contains, besides starch, other substances, particularly mucine and vegetable gluten, which do not dissolve in the water at the ordinary terminal mashing temperature, and which consequently remain in the husks, and are lost to the wort; but if the temperature of the water or mash should be raised sufficiently to produce a dissolution of the above-named substances, the sugar-forming effect of the diastase would be stopped. If, however, after the formation of the sugar in the malt has been completed, the wort collected on the top of the malt is caused to percolate through the malt at a temperature of sufficient height, all the useful substances contained in the malt are dissolved, and the quality of the wort is materially improved.

This object is fully attained by my new process.

I commence by mashing in any of the well-known methods, using about thirty-two gallons of water for two bushels of malt, until the terminal mashing temperature is reached. When the mashing has been finished the malt, after a short time, settles down on the bottom of the mash-tun, and the dull wort collects at the top thereof, as indicated in the diagram, where the letter A designates the mash-tun, the letter B the malt, and the letter C the wort collected on the top of said malt. This wort I draw off from the top of the malt, either by means of a faucet, D, secured in the side of the mash-tun, just above the parting-line between the malt and the wort, or said wort may be drawn off by a siphon or any other suitable means, and while the malt remains in a state of rest in the mash-tun I heat the wort drawn off, as above stated, in a kettle to the boiling-point. After having boiled this wort for about an hour, and after the formation of sugar in the malt has been completed, I pour the boiling liquid back into the mash-tun without further mashing or agitation, and at the same time I open the stop-cock E in the bottom of the mash-tun, so that the boiling wort in percolating through the malt dissolves the mucine and gelatine without disturbing the effect of the diastase which has already ceased, and thereby all the useful constituents of the malt are saved and carried off by the wort.

What I claim as new, and desire to secure by Letters Patent, is—

The within-described process for brewing beer, which consists in drawing off above the malt which settles down on the bottom of the mash-tun after the agitation ceases the wort which collects on the top of said malt during the time of rest, then heating the same to the boiling-point, and causing the boiling liquid to percolate through the malt (after the formation of sugar in the malt has been completed) without any further mashing or agitation, thereby dissolving the mucine and gluten contained in the malt without disturbing the effect of the diastase, substantially as specified.

In testimony that I claim the foregoing I have hereunto set my hand and seal this 11th day of July, 1877.

ANTON SCHWARZ. [L. S.]

Witnesses:
W. HAUFF,
E. F. KASTENHUBER.